United States Patent [19]

Obenshain

[11] 4,427,636

[45] Jan. 24, 1984

[54] METHOD AND APPARATUS FOR MAKING OZONE

[75] Inventor: David N. Obenshain, Swanton, Md.

[73] Assignee: Westvaco Corporation, New York, N.Y.

[21] Appl. No.: 332,516

[22] Filed: Dec. 21, 1981

Related U.S. Application Data

[62] Division of Ser. No. 200,782, Oct. 27, 1980, Pat. No. 4,329,212.

[51] Int. Cl.³ .............................................. C01B 13/00
[52] U.S. Cl. ........................... 422/186.07; 422/186.30; 204/157.1 R; 204/176
[58] Field of Search ...................... 422/186.30, 186.07; 204/157.1 R, 176; 210/760

[56] References Cited

U.S. PATENT DOCUMENTS

| | | | |
|---|---|---|---|
| 2,683,693 | 7/1954 | Celmer | 252/301.6 |
| 3,993,911 | 11/1976 | Graentzel | 422/186.30 |
| 4,086,152 | 4/1980 | Rich et al. | 204/176 |
| 4,095,115 | 6/1978 | Orr, Jr. et al. | 422/186.07 |
| 4,124,467 | 11/1980 | Pincon | 204/157.1 |
| 4,179,616 | 12/1979 | Coviello et al. | 422/186.30 |
| 4,182,663 | 1/1980 | Vaseen | 204/157.1 |
| 4,199,419 | 4/1980 | Holroyd et al. | 422/186.30 |
| 4,214,962 | 7/1980 | Pincon | 210/157.1 R |
| 4,230,571 | 10/1980 | Dadd | 210/760 |
| 4,317,044 | 2/1980 | Vaseen | 204/176 |

OTHER PUBLICATIONS

Rideal, E., 1920, Ozone, Constable and Company, Ltd., London, pp. 22-27, 70-73.
Kirk-Othmer, Encyclopedia of Chemical Technology, vol. 16, John Wiley and Sons, New York, pp. 688-691.

*Primary Examiner*—Benjamin R. Padgett
*Assistant Examiner*—Howard J. Locker

[57] ABSTRACT

An apparatus and method is disclosed for manufacturing ozone by treating oxygen or an oxygen bearing gas with UV radiation in the range of from about 130-170 nm. The method involves the use of cathode rays to bombard a UV emitting material which emits radiation substantially in the 130-170 nm range. The invention takes advantage of the fact that no radiation is generated substantially above 200 nm or below 130 nm which wavelengths tend to destroy ozone. Thus, unlike the prior art, the present invention does not both make and destroy ozone, but simply makes ozone.

9 Claims, 7 Drawing Figures

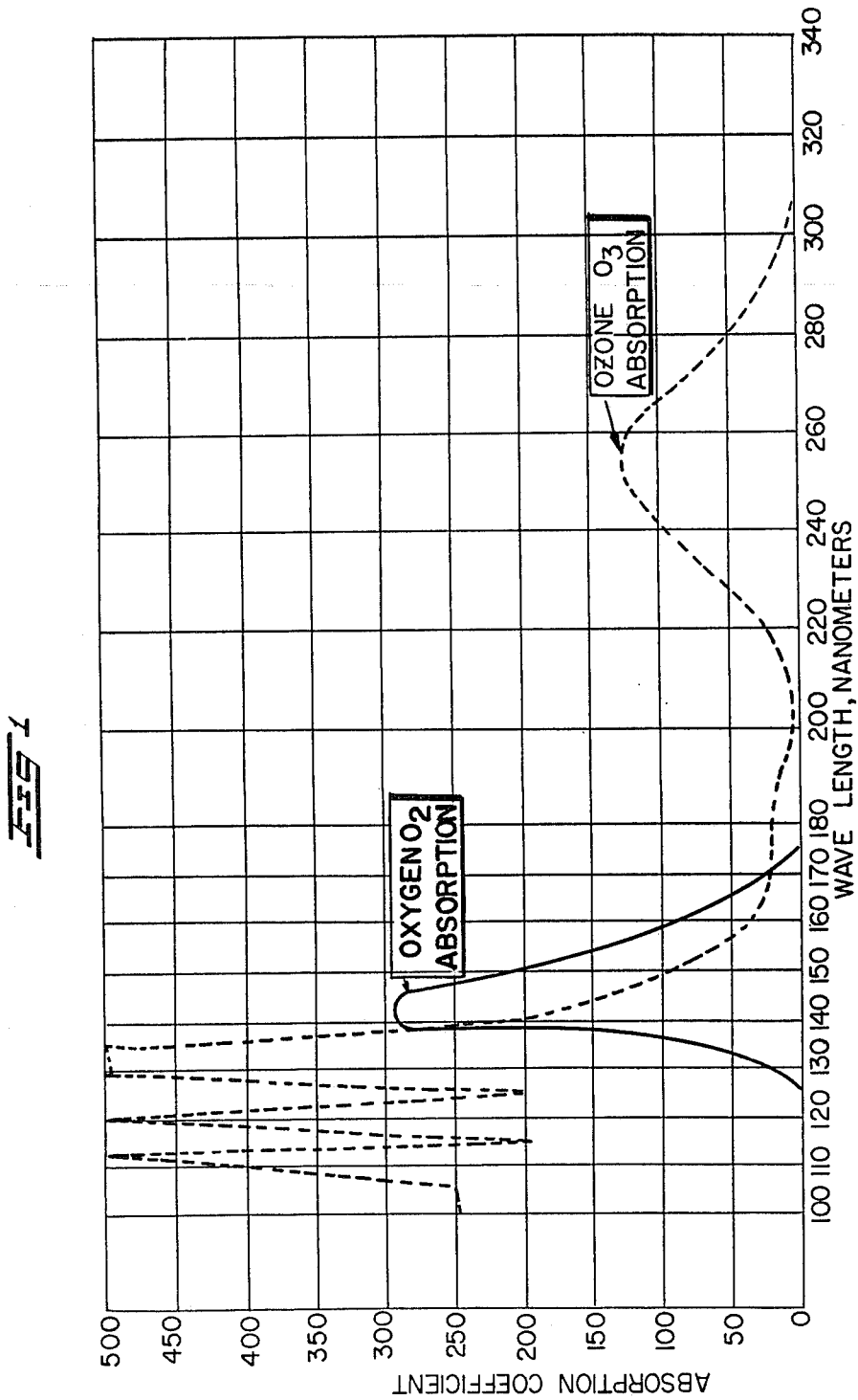

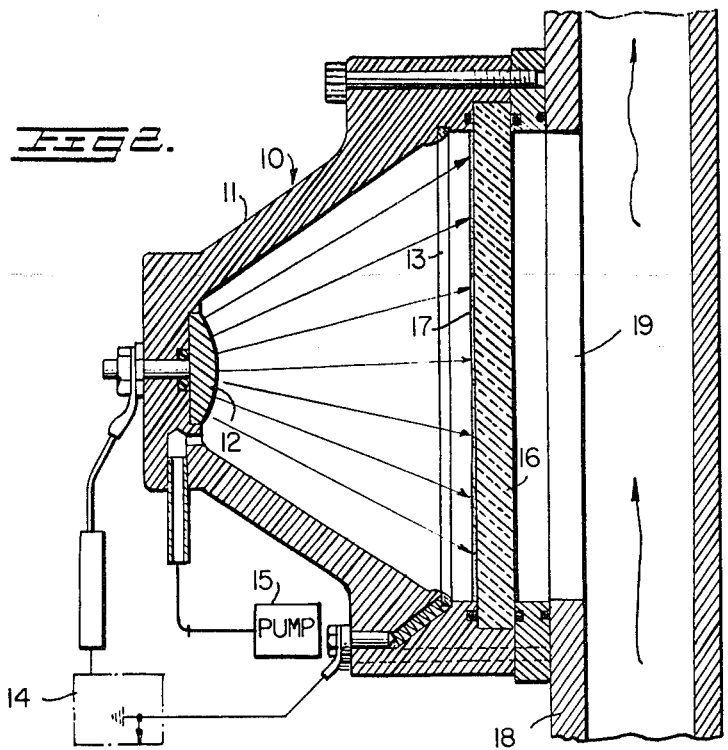
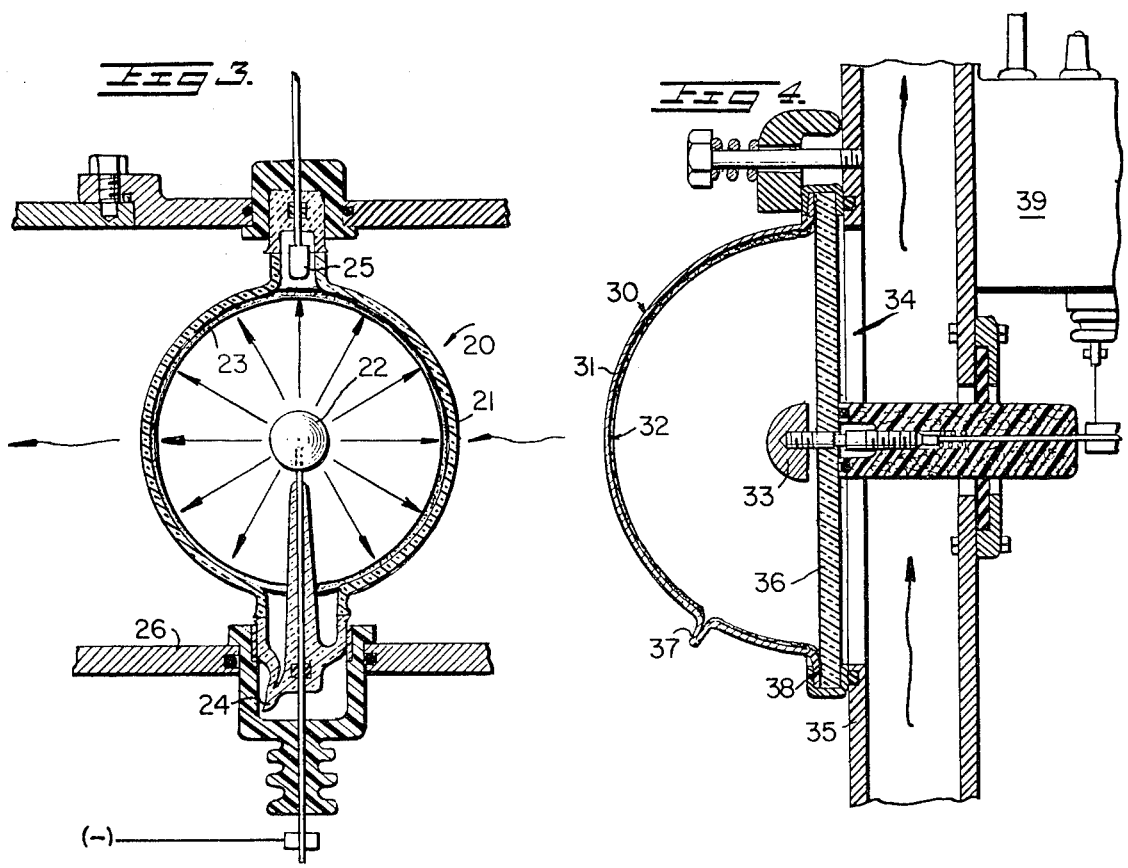

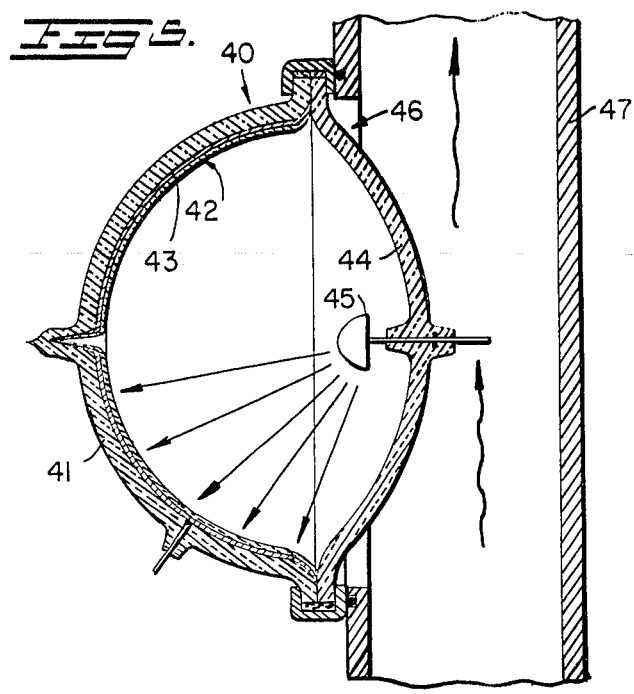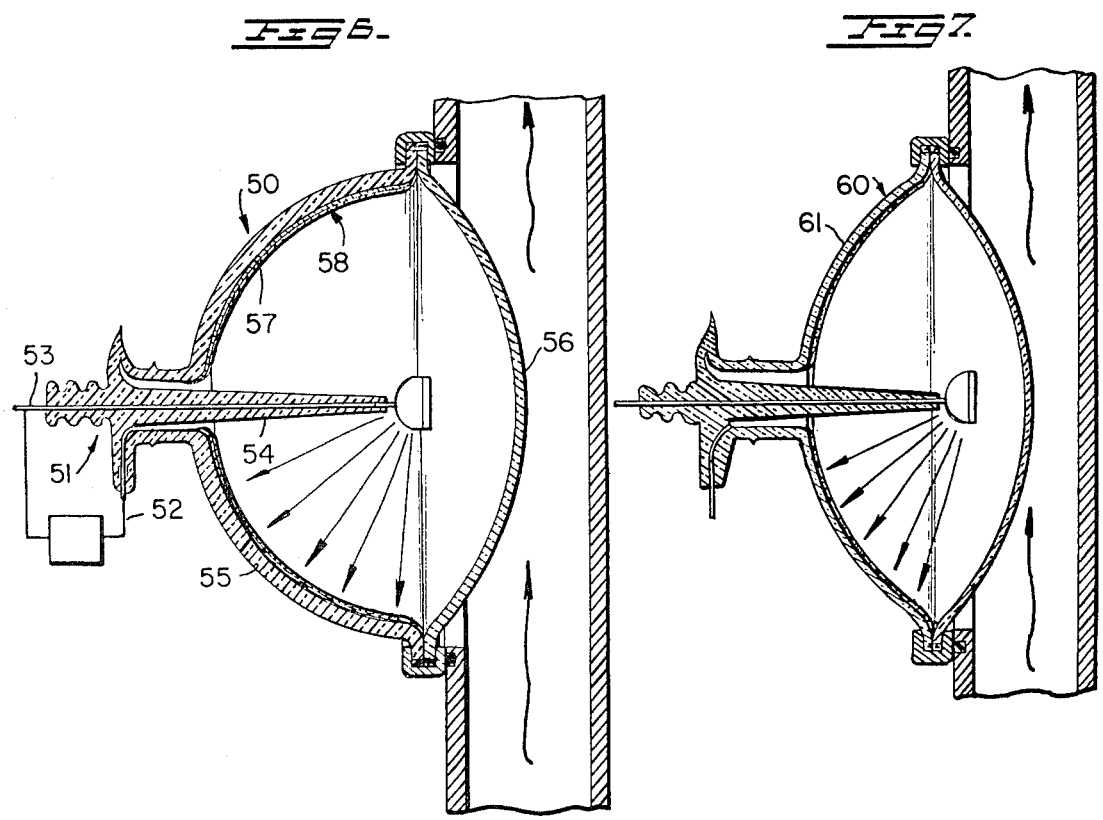

METHOD AND APPARATUS FOR MAKING OZONE

This is a divisional application Ser. No. 200,782 filed Oct. 27, 1980 and now U.S. Pat. No. 4,329,212.

BACKGROUND OF INVENTION

The present invention relates generally to an improved apparatus and method for the generation of singlet oxygen atoms which may combine with oxygen molecules to produce ozone.

In general, there are two basic methods for producing ozone. One such method involves gaseous discharge type devices wherein a gas filled tube is used to produce radiation of a suitable wavelength to generate ozone. Another method involves the use of electrical energy from corona discharge, x-rays, cathode rays and the like to produce radiation that generates ozone. In either case, the principle behind the production of ozone involves the adsorption by oxygen of ultraviolet radiation to form singlet oxygen atoms which combine with other oxygen molecules to produce ozone.

The prior art includes many patents and other literature which describe variations of the two ozone generation methods outlined above, and which describe different types of apparatus useful for producing ozone and for utilizing the ozone so produced. Unfortunately most of the ozone generators of the prior art are inefficient or unworkable for various reasons. Chief among these reasons is the failure of the prior art practitioners to recognize that ozone is only produced over a very narrow range of the entire electromagnetic spectrum, and in fact is destroyed by a wide range of radiation in the electromagnetic spectrum. Thus, in much of the prior art, the methods described actually suggest using radiation which includes wavelengths that destroy ozone. However, in accordance with the present invention, a method and apparatus for generating ozone is described wherein only radiation of the desired wavelength is generated and transmitted for maximum efficiency.

SUMMARY OF INVENTION

The present invention is based on the discovery that ozone may be generated by exposing air or oxygen to ultraviolet radiation of wavelengths to cause the oxygen molecule to split into two oxygen atoms, which being very reactive, immediately combine with other oxygen molecules to form ozone. Conversely, the invention is based on the discovery that exposure of ozone to certain other wavelengths in the electromagnetic spectrum causes it to decompose and revert back to oxygen.

The reliability of absorption data below 200 nm (nanometers) is not absolute, because in this region, ultraviolet light is not only absorbed by oxygen and ozone, but it converts oxygen to ozone and also converts ozone back to oxygen. However, above 200 nm, it is quite clear that very little if any oxygen may be converted to ozone. If fact, above 200 nm, ozone has a very strong absorption band peaking at 254 nm. Meanwhile, in the region below 200 nm, both oxygen and ozone have strong areas of ultraviolet radiation absorption. Oxygen appears to have a maximum absorption from about 130 to 170 nm while ozone has strong absorption bands from 110 to 140 nm. In the overlap area between about 140 to 180 nm, ultraviolet radiation both makes and decomposes ozone simultaneously. However, in actual practice, some equilibrium concentration of oxygen and ozone would be reached in this region. Meanwhile, based on this analysis, it appears that a narrow band of radiation from 130 to 170 nm, with none above 200 nm and none below 130 nm, would be optimum for ozone generation. Accordingly, with this knowledge in mind, the present invention was developed.

According to the present invention, the method of ozone generation is of the type using electrical energy to produce electrons which in turn bombard a substance which emits the desired UV radiation. The preferred source of electrical energy for the present invention is cathode rays although other sources of electrical energy could be substituted if desired. Cathode ray tubes (CRT's) are preferred because of their relatively high power-to-light efficiency, on the order of about 30%. Meanwhile, in order to generate radiation only in the 130 to 170 nm wavelength, the UV emitting substance may comprise a specially blended coating or the like designed to emit only in the desired region. It is known that UV emitting phosphors may be formulated to cover rather narrow emission bands, unlike gases which generally emit radiation over a rather wide range. Finally, the CRT's are provided with windows that will transmit the UV radiation. Such windows may comprise those made from quartz, fluorite and other glass-like materials known to transmit radiation in the desired range.

In operation, one or more of the CRT's are arranged with their transmitting windows opposite a duct through which oxygen or air is passed. As the oxygen or air moves past the windows, the CRT's are energized to produce cathode rays which bombard the UV emitting coatings. When excited by the cathode rays, these coatings emit UV radiation. This radiation in the desired 130–170 nm range is in turn transmitted through the transmitting windows where oxygen molecules passing by may be split into singlet oxygen atoms which combine with other oxygen molecules to produce ozone.

DESCRIPTION OF DRAWING

FIG. 1 is a graph showing absorption curves for oxygen and ozone;

FIG. 2 is a side view in cross section of a typical cathode ray tube ozone generating cell according to the present invention;

FIG. 3 is a schematic cross sectional view of a spherical cathode ray ozone generating cell;

FIG. 4 is a side view in cross section of an inverse cathode ray ozone cell; and, FIGS. 5–7 show schematically modified constructions for inverse cathode ray ozone cells.

DETAILED DESCRIPTION

FIG. 1 illustrates graphically absorption curves for oxygen and ozone over the electromagnetic spectrum. These curves are based on data found in the text *Vacuum Ultraviolet Spectroscopy*, by Zaidel & Shrieder, pages 280, 291. Ozone has strong absorption bands from about 110 to 140 nm while oxygen seems to have maximum absorption from about 130 to 170 nm. Oxygen and ozone overlap to some extent from about 140 to 180 nm, but ozone has a very strong absorption band peaking at 254 nm. Thus, judging from the absorption curves, it appears that a narrow band of radiation from 130 to 170 nm with none above 200 nm and none below 130 nm would be optimum for ozone generation.

Referring more particularly to FIG. 2 of the drawing, an ozone generating cell is illustrated in the form of a typical cathode ray tube (CRT) 10. The CRT includes an acrylic or other nonconducting housing 11 inside which is located a cathode element 12 and an anode 13. It is a well known fact that cathode rays (negative electrons) are emitted normal to the surface of the cathode at their points of emission. A concave cathode can thus focus the rays to a point, and a convex cathode can spread the cathode rays to cover a large area as shown in FIG. 2. The CRT is connected to a high voltage source 14 and is evacuated with a vacuum pump 15 or the like.

Opposite the cathode element 12, the CRT is provided with a window element 16 that is manufactured from a material that will transmit radiation at the desired lower end of the UV spectrum. The window 16 may be constructed from any material that transmits in the desired range of which fluorite is one example. Other examples of window materials that may be useful for the present invention include combinations of quartz and fluoride and UV emitting windows prepared from thiourea-formaldehyde resins. The inside of the window 16 is coated with a material 17 that is designed to emit radiation only in the desired 130-170 nm range when bombarded with cathode rays discharged from cathode 12. A preferred material for this purpose is a specially designed phosphor coating prepared from a zinc oxide magnesium oxide matrix with a small amount of an activator, usually a rare earth element. U.S. Pat. No. 2,683,693 describes a process for preparing UV emitting coatings substantially as required for the present invention. However, other phosphor materials may be used, particularly as disclosed in U.S. Pat. No. 2,779,949, providing the materials are made to limit their emissions to the desired 130-170 nm wavelengths.

As shown in FIG. 2, the CRT housing 11 is mounted adjacent an opening in a duct 18 through which air or oxygen is passed for making ozone. In a preferred embodiment, the duct 18 would be provided with a plurality of CRT ozone generators (not shown) each arranged with their windows 16 adjacent to openings wherein the UV radiation emitted from the phosphor coating would be transmitted directly to the passing gas. In this manner the efficiency of such a generating device would be enhanced.

Even greater efficiency from the cathode ray generating device can be achieved from the device illustrated in FIG. 3. For this purpose a spherical cathode ray tube 20 is used to take advantage of the backscatter effects commonly found with conventionally shaped CRT's. Thus, in FIG. 3, the spherical cathode ray tube 20 includes a UV transmitting bulb or enclosure 21 constructed from fluorite, quartz/fluorite or other UV transmitting materials which encloses a spherical cathode 22. The tube 21 has applied to its inner surface a coating 23 of a phosphor material or the like which emits radiation in the desired 130-170 nm range. The tube 21 is vacuum sealed at 24 and includes an anode 25 mounted at one end. As in a conventional CRT, the anode and cathode are connected to a high voltage source. The tube 21 is mounted in a duct 26 through which oxygen or air is passed for making ozone. In a preferred embodiment, a plurality of the spherical cathode ray tubes 20 would be arranged in the duct 26 for increased efficiency. Thus, as the gas flows past the spherical cathode ray tubes 20 within duct 26, the UV radiation emitted by the coating 23 passes through the tube walls 21 to produce ozone.

In each of the embodiments disclosed in FIGS. 2 and 3 the UV emitting coating 17 and 23 is applied to the inside of the CRT where the coating can be bombarded with electrons from the cathode. For this purpose, the applied coatings must be thick enough to capture all of the electrons but still thin enough to allow the emitted radiation to pass through the coating. In order to overcome any problems attendant with this practice, the embodiment illustrated in FIG. 4 was developed.

FIG. 4 shows an inverse cathode ray ozone cell 30 wherein a semispherical metal cavity 31 is used as the anode and is coated with a phosphor material 32 that emits UV radiation in the desired 130-170 nm range. The cathode 33 is arranged opposite the inverse cavity 31 to insure that all electrons emitted from the cathode are captured. Meanwhile, the metal cavity 31 is arranged opposite an opening 34 in the duct 35 where a UV transmitting window 36 is positioned. In this arrangement, UV emissions from the phosphor coating 32 are reflected from the polished inner surface of the metal cavity 31 and they travel unimpeded through the window 36. Thus, gas flowing through the duct 35 is exposed to the UV radiation to produce ozone. As in the case of the embodiments of FIGS. 2 and 3, the inverse cathode ray cell of FIG. 4 would be evacuated at 37 and sealed to the window 36 at 38. Similarly, the cathode 33 would be connected to a suitable high voltage source 39 or the like, and for increased efficiency, a plurality of such cells 30 could be arranged along the duct 35.

FIGS. 5-7 illustrate modifications of the FIG. 4 embodiment. In FIG. 5, an all glass construction is shown wherein the inverse cathode ray cell 40 is prepared from a glass bowl 41 or the like. The inside surface of the bowl 41 is supplied with a coating of aluminum 42 to serve as an anode, and the aluminum coating is over-coated with the preferred UV emitting phosphor material 43 described hereinbefore. At the opposite side of the bowl 41, the UV transmitting window 44 is illustrated as being domed which enables the window to be made of reduced thickness as compared with a flat structure. The cathode 45 is positioned as shown, the glass bowl/window combination is evacuated and sealed over the opening 46 in duct 47, and a high voltage source (not shown) is provided to energize the cathode. Thus, when electrons produced by cathode 45 strike the UV emitting coating 43, the UV radiation generated is reflected from the inside surface of bowl 41 and passes through the UV transmitting window 44 to convert gas flowing through duct 47 to ozone.

In FIG. 6, another all glass construction is illustrated wherein the inverse cathode ray cell 50 is provided with a unitized electrode assembly 51. For this purpose, the anode and cathode connections 52,53 are both arranged in an attachment 54 integral with the bowl 55. This arrangement permits all electrical connections to be made in one area with no obstructions in the gas duct 59. Moreover, this arrangement also allows the window element 56 to be constructed from one piece of window material allowing an even thinner construction but with the same strength as that used in FIG. 5. The FIG. 6 modification also employs an inner coating of aluminum 57 as the anode and includes the UV emitting coating 58 applied to the inside of bowl 55 described for FIG. 5. In like manner, the ozone generating cell 50 of FIG. 6 is mounted adjacent an opening in duct 59 to expose the gas flow therethrough to the emitted UV radiation to generate ozone.

FIG. 7 illustrates a slight modification to the arrangement shown in FIG. 6 wherein the inverse cathode ray cell 60 is constructed with a semispherical cavity 61 rather than a hemispherical shape. Such a construction should be cheaper to manufacture and because of the flatter shape, provide a shorter and more direct path for the UV radiation to travel. In other respects, the modification shown in FIG. 7 would be constructed like the modifications shown in FIGS. 5 and 6.

The foregoing description of the invention has been directed to several embodiments and modifications of a basic CRT ozone generating apparatus and method. It will be apparent, however, that those skilled in the art may make modifications and changes in the schematically shown apparatus without departing from the scope and spirit of the invention. For instance, incidental heat generated by the apparatus will have to be removed from the system. Those versed in the art of ozone generation will be familiar with means for cooling the system and the equipment and methods available. Similarly modifications in the apparatus and method necessary to satisfy the needs of any particular field installation, whether in scaling the apparatus up in size or in providing special gas and ozone handling accessories, or in constructing the apparatus of materials chosen for environmental stability, are well within the state of the art. Accordingly, the following claims are intended to cover all such modifications and variations that fall within the true spirit and scope of the invention.

I claim:

1. Apparatus for producing ozone comprising a duct, an inlet for introducing an oxygen bearing gas into said duct and an outlet for discharging ozone from said duct, one or more energy generating cells associated with said duct and adapted to produce energy that is converted into ultraviolet radiation for converting oxygen into ozone, said energy generating cells comprising cathode ray generators which are oriented so that the electrons emitted from their cathodes bombard a UV emitting source included within each cell to produce UV radiation only in the range of from about 130 to 170 nm with substantially none below 130 nm and none above 170 nm, and means for exposing the oxygen bearing gas in said duct to the ultraviolet radiation produced by said UV emitting source to convert at least a portion of the oxygen bearing gas to ozone.

2. The apparatus of claim 1 wherein said energy generating cells are mounted on the exterior of said duct opposite one or more openings, said openings being covered with UV transmitting windows which transmit only the emitted UV radiation to the oxygen bearing gas in said duct.

3. The apparatus of claim 2 wherein the UV emitting source is applied to the inside of the UV transmitting windows in the form of a thin film of a UV emitting material.

4. The apparatus of claim 1 wherein the energy generating cells are in the form of spheres which are mounted within said duct and located within enclosures formed from a UV transmitting window material, said UV emitting source being applied to the inside of said UV transmitting enclosures in the form of a thin film of a UV emitting material.

5. The apparatus of claim 2 wherein the UV emitting source is applied to a surface of the energy generating cell opposite the UV transmitting windows in the form of a thin film of a UV emitting material.

6. The apparatus of claim 5 wherein the cathode ray generator of each energy generating cell comprises as the anode element a hemispherical metal cavity mounted opposite each UV transmitting window with a cathode element arranged opposite and mounted inversely of the cavity and the UV emitting material is applied to the inside surface of said metal hemisphere.

7. The apparatus of claim 5 wherein the cathode ray generator of each energy generating cell comprises a glass hemisphere mounted opposite each UV transmitting window and arranged inversely to the cathode element, said glass hemisphere being coated on its inside surface with an anode material which is overcoated by said UV emitting material.

8. The apparatus of claim 5 wherein the cathode ray generator of each energy generating cell comprises a glass hemisphere mounted opposite each UV transmitting window with a unitized electrode assembly wherein the cathode is mounted inversely and interiorly of said hemisphere on an integral extension of said hemisphere and said hemisphere is coated on its inner surface with an anode material which is overcoated by said UV emitting material.

9. The apparatus of claim 5 wherein the cathode ray generator of each energy generating cell comprises a semispherical glass cavity mounted opposite each UV transmitting window with a unitized electrode assembly wherein the cathode is mounted inversely and interiorly of said semispherical cavity on an integral extension of said semispherical cavity and said semispherical cavity is coated on its inner surface with an anode material which is overcoated by said UV emitting material.

* * * * *